United States Patent
Galbiati et al.

(10) Patent No.: US 6,680,598 B2
(45) Date of Patent: Jan. 20, 2004

(54) CIRCUIT FOR THE SPEED RECOVERY OF A DIRECT CURRENT MOTOR AND METHOD USING SAID CIRCUIT

(75) Inventors: Ezio Galbiati, Agnadello (IT); Maurizio Nessi, Como (IT); Luca Schillaci, Belgioioso (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/988,911

(22) Filed: Nov. 19, 2001

(65) Prior Publication Data

US 2002/0081106 A1 Jun. 27, 2002

(30) Foreign Application Priority Data

Nov. 20, 2000 (EP) .............................................. 00830764

(51) Int. Cl.$^7$ .................................................. H02P 5/00
(52) U.S. Cl. .................... 318/717; 388/800; 388/907.2; 318/299; 318/376
(58) Field of Search ................................. 318/379, 375, 318/293, 299, 376, 717; 388/800, 907.2

(56) References Cited

U.S. PATENT DOCUMENTS

| | | | | |
|---|---|---|---|---|
| 3,786,329 A | * | 1/1974 | Whited | 318/379 |
| 4,319,171 A | * | 3/1982 | Motoori | 318/379 |
| 4,545,004 A | * | 10/1985 | Kade et al. | 363/63 |
| 5,495,372 A | * | 2/1996 | Bahlmann et al. | 360/75 |
| 5,504,402 A | * | 4/1996 | Menegoli | 318/377 |
| 5,552,685 A | * | 9/1996 | Young et al. | 318/254 |
| 5,631,527 A | * | 5/1997 | Canclini | 318/254 |
| 5,644,484 A | * | 7/1997 | Elango | 363/98 |
| 5,737,144 A | * | 4/1998 | Ataee et al. | 360/75 |
| 5,760,555 A | * | 6/1998 | Yamano et al. | 318/293 |
| 5,877,914 A | | 3/1999 | Gontowski, Jr. | 360/78.12 |
| 6,005,359 A | * | 12/1999 | Brambilla et al. | 318/368 |
| 6,008,619 A | * | 12/1999 | Murase et al. | 318/811 |
| 6,140,784 A | * | 10/2000 | Mazda | 318/280 |
| 6,160,368 A | * | 12/2000 | Plutowski | 318/375 |
| 6,229,273 B1 | * | 5/2001 | Kelly et al. | 318/254 |
| 6,353,298 B1 | * | 3/2002 | Jeffrey | 318/293 |
| 6,369,534 B1 | * | 4/2002 | Menegoli | 318/254 |

FOREIGN PATENT DOCUMENTS

EP    0 911 954 A1    4/1999

* cited by examiner

Primary Examiner—Robert E. Nappi
Assistant Examiner—Eduardo Colon-Santana
(74) Attorney, Agent, or Firm—Lisa K. Jorgenson; Harold H. Bennett, II; Seed IP Law Group PLLC (57) ABSTRACT

A circuit for the speed recovery of a direct current motor includes an output stage, output stage having a first pair of transistors, a second pair of transistors, and means a first circuit configured to detect a current circulating in the motor. The output stage further includes a second circuit configured to, activate the second pair transistors for a determined first time period so as to short-circuit the motor, and, at the end of the first time period, unbalance the output stage so as to force a maximum current to circulate for a determined second time period as a function of a value detected by the first circuit during the first time period, so as to stop the motor.

26 Claims, 4 Drawing Sheets

CIRCUIT FOR THE SPEED RECOVERY OF A DIRECT CURRENT MOTOR AND METHOD USING SAID CIRCUIT

BACKGROUND OF THE INVENTION

1. Field of the Invention

The present invention refers to a circuit for the speed recovery of a direct current motor and method using said circuit, in particular for a Voice Coil Motor (VCM).

2. Description of the Related Art

A VCM is used for example to drive a mechanical arm on which the writing and/or reading heads for the data registered on a hard disk are mounted.

In said application field in the searching steps for new tracks to be written and/or read, the VCM is capable of giving strong accelerations/decelerations to the mechanical arm that supports the head so as to minimize the track search time.

In fact during these phases the heads can reach speeds on the order of 2÷2.54 m/sec.

A problem that has to be dealt with in a hard disk, in the event that the supply voltage is suddenly cut off, is therefore to prevent the arm supporting the reading and writing heads from hitting, at high speed, against the stop positions inside and outside the platters forming the hard disks.

At present the speed recovery of the VCM has taken on a significant importance with the manufacturers of hard disks, as the rotating speed they reach is very high, and following the introduction of the ramp loading technique, a technique according to which the reading and/or writing heads are parked at the extremity of a ramp made of a plastic material outside the disks, it turns out to be essential that said arm, supporting the so-called heads, is prevented from hitting, at high speed, against said parking ramp.

In the device L6244 produced by the Applicant, in the event of losing power, the output stage which drives the VCM is placed at high impedance so as to measure the speed of the motor through a value of the BEMF (Back Electromagnetic Force) generated by the same VCM. The value of the BEMF is memorized at the terminals of a capacitor so that once the sampling step of the BEMF is terminated, the braking action is executed by turning on the output stage again, that is by applying a voltage which has a value equal to that previously stored in the capacitor, but with an opposite polarity so as to dampen the motion of the VCM. In this condition the capacitor is discharged through of a resistor, thus defining a time of duration of this speed recovery step.

In another device L6246 produced by the Applicant, at the time the power supply is lost, the output stage driving the VCM is placed in the so-called brake configuration, that is, in a configuration wherein the low side transistors of the output bridge are placed in conduction. In this manner it is as if the VCM had its terminals in short circuit and it is therefore the VCM itself that generates a braking current. This braking condition is held for a time which is determined by the discharge constant of a R-C circuit.

In both cases the speed recovery is executed in open loop and the motor is submitted to a braking action for a certain preset time, not keeping, however, the speed of the VCM itself under control.

The effectiveness of these methods is technologically valid but is not sufficient to guarantee the speed recovery, in the time of a few milliseconds, which the modem VCMs are able to develop.

Other systems known for braking the VCM, while keeping control of the speed, drive the Pulse Width Modulation (PWM) type output stage in discontinuous mode. In this manner the braking current is interrupted and zeroed at every period of the PWM signal to permit the measurement of the BEMF and therefore the speed of the VCM itself, thus permitting the determination of the moment for terminating the speed recovery procedure.

In this case the effectiveness of the braking is not particularly energetic as the current must be zeroed periodically to be able to permit the measurement of the BEMF representing the speed of the VCM.

In addition, for all the systems, there is also the problem that in the absence of a supply voltage the only circuitry which remains supplied is that which carries out the parking of the heads, while all the other devices, such as the micro-processor or the Digital Signal Processor (DSP), lose every functionality.

BRIEF SUMMARY OF THE INVENTION

In view of the state of the technique described, an embodiment of the present invention provides a circuit for the efficient and controlled recovery of the speed of a direct current VCM type motor, in particular at the time the power voltage is disconnected after a search for a new track to be read and/or written has been actuated.

A further embodiment of the present invention supplies a method capable of guaranteeing the efficient and controlled recovery of the speed of a VCM.

In accordance with an embodiment of the present invention, a circuit is provided for recovering the speed of a direct current motor comprising an output stage, consisting of a first couple of transistors and of a second couple of transistors, and first means, for detecting a circulating current in said motor, and second means, suitable for activating said second couple of transistors of said output stage for a determined first time period so as to short-circuit said motor, and at the end of said first time period said second means being suitable for unbalancing said output stage in such a manner as to force the maximum circulating current for a determined second time period in function of the value detected by said first means during said first time period so as to stop said motor in the shortest time possible.

another embodiment provides a method for the speed recovery of a direct current motor including a) checking if there is a loss of supply voltage; b) short-circuiting a first couple of transistors for a first Lime period; c) measuring a current proportional to the rotation speed of said motor; d) measuring a current proportional to the rotation direction of said motor; e) forcing a current of greater intensity than that measured at during the measuring steps and the same polarity for a second time period in said motor;

f) repeating repeating the short circuiting, measuring and forcing steps until said current returns to a determined measure interval; g) generating an end-of-procedure signal.

Thanks to the present invention a circuit and a method can be provided which are capable of preventing the arm supporting the reading and/or writing heads from hitting at high speed against the end-of-stroke positions inside or outside the platters comprising the hard disks.

BRIEF DESCRIPTION OF THE SEVERAL VIEWS OF THE DRAWING(S)

The characteristics and advantages of the present invention will become apparent from the following detailed description of an embodiment thereof, illustrated as non-limiting example in the enclosed drawings, in which.

DETAILED DESCRIPTION OF THE INVENTION

Figure 1:
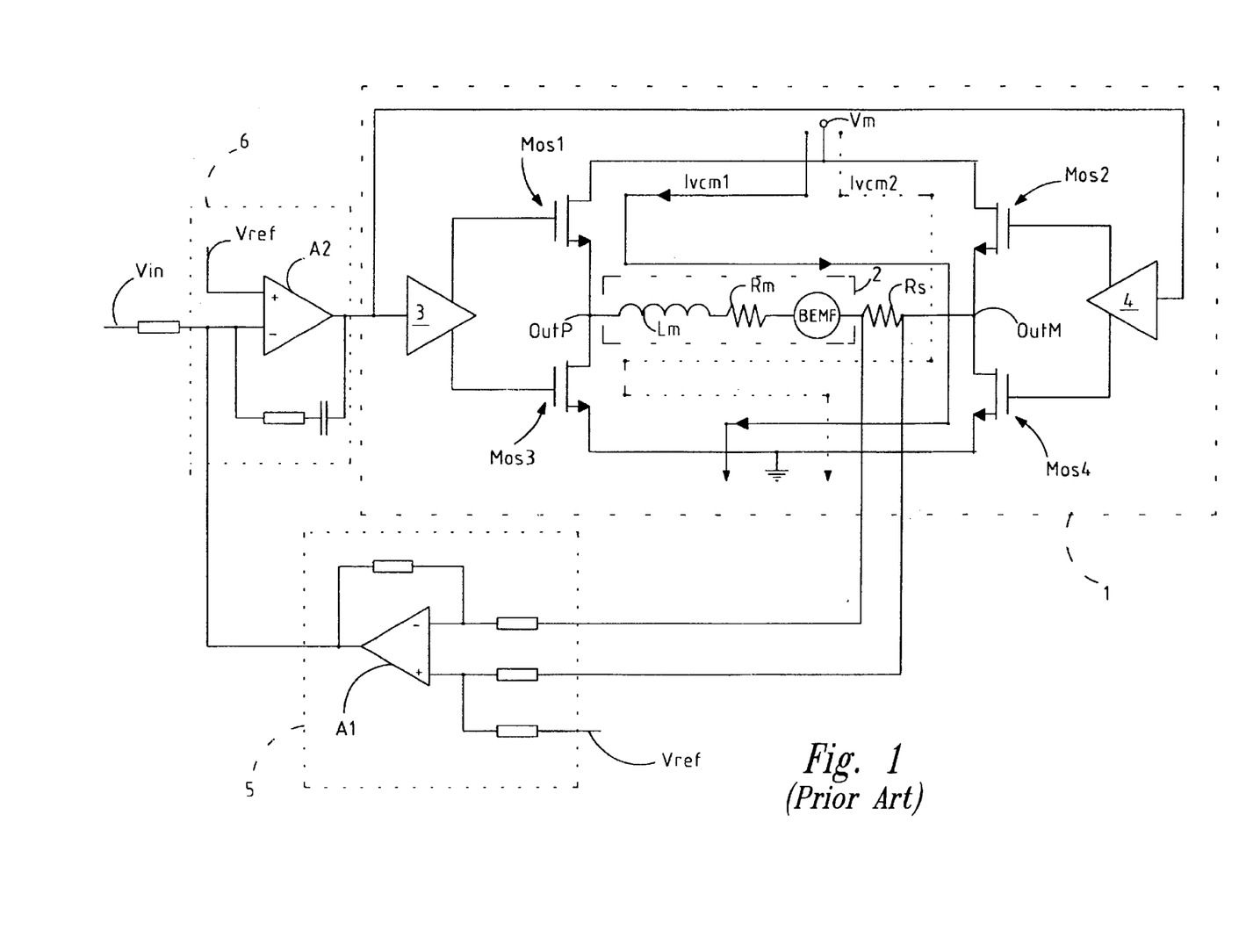
FIG. 1 shows a circuit diagram used for the control of the current in a VCM in applications for hard disk according to the known technique.

In FIG. 1 the circuit diagram is shown of a control bridge 1 for a direct current motor 2 of VCM type, which motor is represented by the series of an inductor Lm, of a resistor Rm and of a generator of BEMF.

Bridge 1 comprises a first couple of N-channel MOS type power transistors, MOS1 and MOS2, called high side transistors, and a second couple of N-channel MOS type power transistors, MOS3 and MOS4, called low side transistors.

The transistors MOS1 and MOS3 have respective gate electrodes controlled by a first driver 3, in addition, the source electrode of the MOS1 is connected with the drain electrode of the MOS3, so as to make an output terminal OutP, the drain electrode of the MOS1 is connected to a supply terminal Vm and the source electrode of the MOS3 is grounded.

The transistors MOS2 and MOS4 have the respective gate electrodes controlled by a second driver 4, in addition, the source electrode of the MOS2 is connected with the drain electrode of the MOS4, so as to make an output terminal OutM, the drain electrode of the MOS2 is connected to the supply terminal Vm and the source electrode of the MOS4 is grounded.

It can also be noted that between said output terminals OutP and OutM there are the motor VCM 2 and a resistor Rs.

At the terminals of said resistor Rs a voltage is developed which is read by a first block 5 comprising an operational amplifier A1, called sense amplifier. The amplifier A1 amplifies the voltage which develops at the terminals of Rs. Said amplifier A1 also has in input a reference voltage Vref which represents the working point of the whole current loop. On the basis of the result of said amplification and by means of a second block 6, comprising another operational amplifier A2, called error amplifier, the bridge 1 is controlled by the inputs of the drivers 3 and 4, according to methods known in the art.

Usually the VCM 2 is driven by means of the bridge 1 functioning in class AB, and during the steps of searching for the tracks and of reading and/or writing, the movement of the VCM 2 is current controlled, in accordance with the diagram of FIG. 1.

As known the best technique for the greatest effectiveness in the speed recovery following a search command is obtained by driving the output stage of 1 so as to activate the diagonal of the MOS transistors opposite to that which was activated in the acceleration step.

Referring to the circuit of FIG. 1, therefore, if for acceleration a current Ivcm1 (represented in the figure with a continuous line) was supplied through the transistors MOS1 and MOS4, in order to obtain a more effective braking the diagonal of the control bridge has to be inverted activating the transistors MOS2 and MOS3 by driving a current Icvm2 in the opposite direction to the previous one (represented in the figure with a dotted line).

In this manner the braking current Ivcm2, which is supplied by VCM 2, depends on the contribution of the voltage Vm that supplies the output stage plus the contribution given by the generator of BEMF that the motor itself generates as it has the same polarity.

Such a technique presents the not unimportant problem of establishing for how long it is necessary to keep the configuration active so as to stop the VCM 2 and to prevent it from accelerating in the opposite direction.

Figures 2, 4:
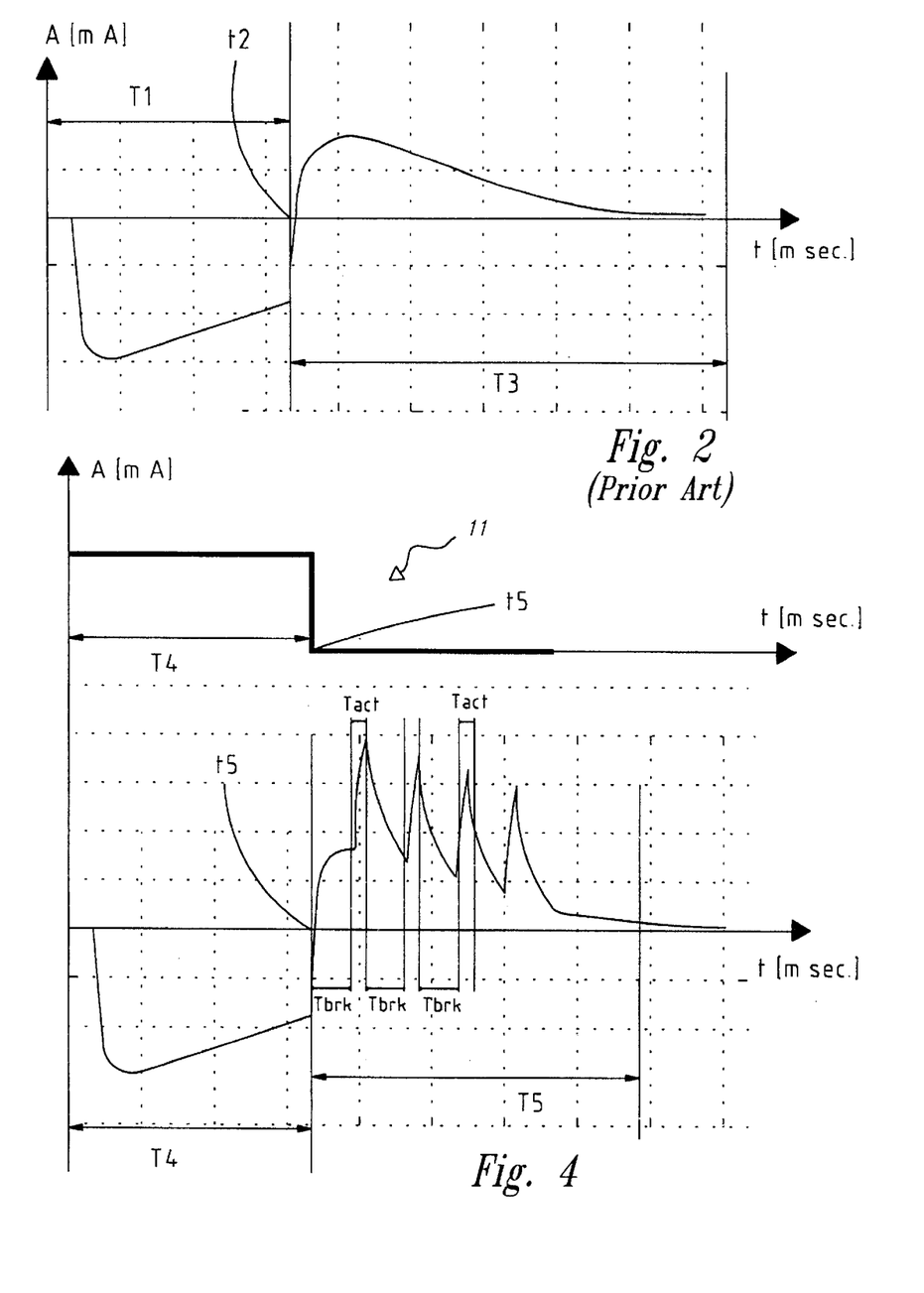
FIG. 2 shows the trend of the current profile at the terminals of the VCM during the speed recovery following a loss of supply in accordance with the diagram of FIG. 1.
FIG. 4 shows the trend of the current profile to the terminals of the VCM during the speed recovery following a loss of supply in accordance with the diagram of FIG. 3.

In FIG. 2 the trend of the current profile at the terminals of the VCM 2 is shown during the speed recovery following a supply loss in accordance with the diagram of FIG. 1.

According to what is shown in FIG. 2, an X-axis indicating the time, expressed in milliseconds, and a Y-axis indicating the current, expressed in milliamperes, can be seen.

In FIG. 2 it can be seen that after a first period T1, that represents an acceleration step of the VCM 2 during which the maximum voltage available is applied to the motor 2, at the instant t2 a loss of the supply voltage occurs and the output stage PWM 1 is placed in brake condition, that is both the low side transistors, MOS3 and MOS4, are turned on.

In this condition it is the motor 2 that generates a braking action as shown during the second period T3. In fact, the BEMF generated by the speed of the motor 2 during the acceleration phase, period Ti, is capable of pushing a current with such a direction to oppose the motion of the motor itself.

Figure 3:
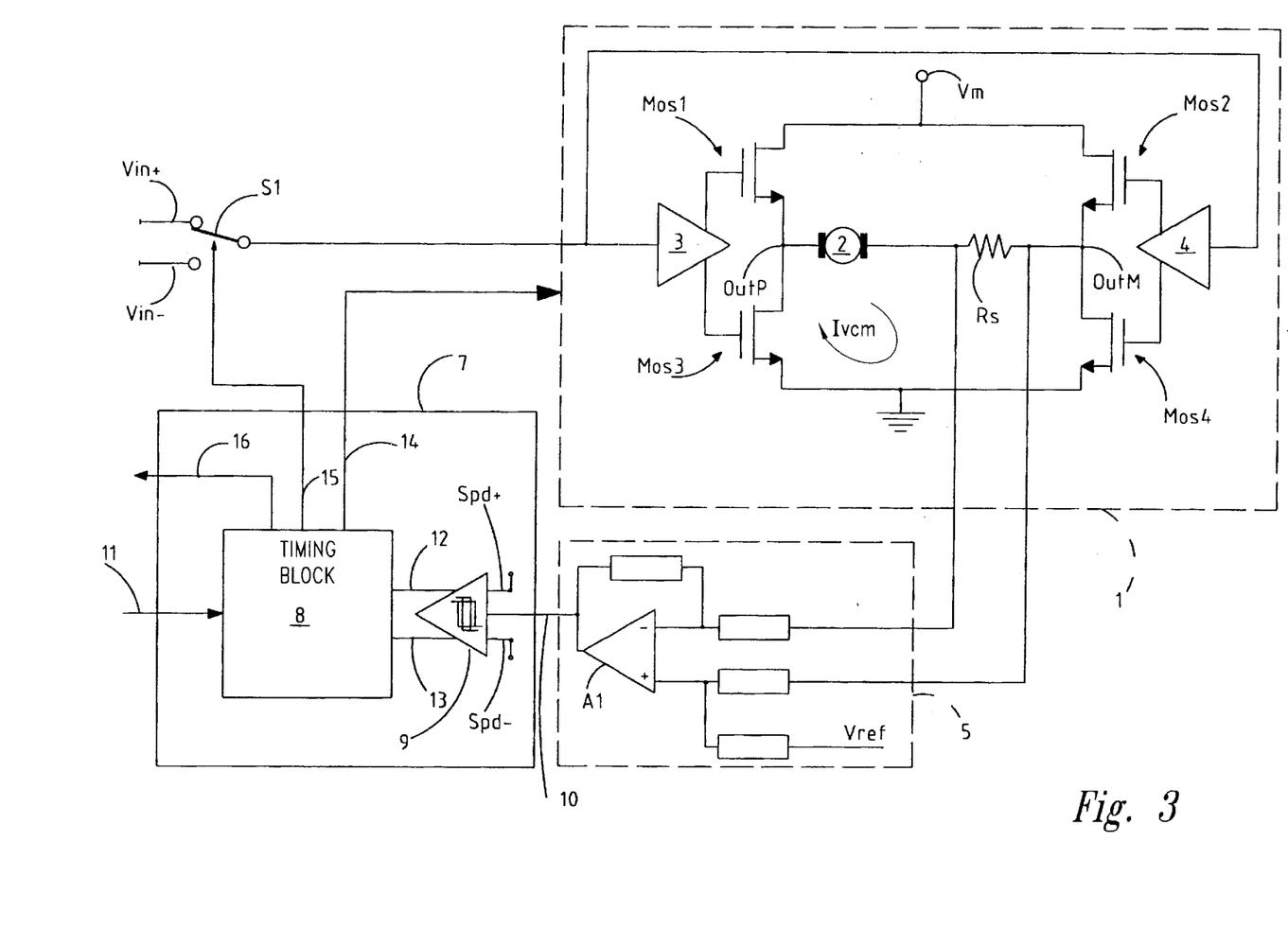
FIG. 3 shows a circuit diagram used for the control of the current in a VCM in applications for hard disk according to the present invention.

In FIG. 3 is shown a circuit diagram used for the control of the current in hard disk VCM applications for according to an embodiment of the present invention.

Besides the circuit elements already illustrated in FIG. 1, excluding the block 6, a block 7 representing the circuitry for the speed recovery, called speed recovery circuitry, can be noted, comprising a timing generator block 8 and a comparator 9. A switch S1 can also be seen, suitable for selectively connecting a positive voltage, Vin+, or a negative voltage, Vin−.

The block 7 receives two input signals, 10 and 11: the signal 10 is the output voltage of the amplifier A1 which is compared by means of the comparator 9 with two input thresholds Spd+ and Spd−. Said thresholds represent respectively the minimum speed at which the braking procedure is to be interrupted, in the case of clockwise and anti-clockwise rotation, respectively; the signal 11 is generated by circuitry (not shown in the figure) capable of signaling the loss of the supply voltage of the motor 2 to timing block 8, also called POR (Power On Reset).

Thus the comparator 9 is a window comparator having a double trip threshold and generates in output a first signal 12, representing the rotation direction of the motor 2, and a second signal 13, indicating that the motor 2 is turning beyond a determined speed.

The time generator 8 receives said signals 11, 12 and 13 in input and generates a first signal 14, representing a braking period Tbrk, a second signal 15, representing an activation period Tact, and a third signal 16, representing the end of the speed recovery procedure.

The last signal 16 is generated once the amplifier 9 detects that the speed of the VCM 2 has returned from the interval defined by the thresholds Spd− and Spd+, or that the speed has reached zero.

The signal 15 controls the switch S1 for the period Tact according to the rotation direction of the motor. In fact S1 connects to the positive voltage Vin+ for all Tact if the rotation is clockwise while it connects to the negative voltage Vin− for all Tact if the rotation is anti-clockwise.

The circuitry of the block 7 therefore detects the speed of VCM 2 at the time the supply is lost, for the whole duration of the braking procedure, and executes the generation of the periods Tbrk and Tact in such a manner as to control the bridge 1 turning on the diagonal of the output stage 1 in accordance with the direction that the current has to have to brake the motor 2, duly commutating switch S1.

Referring to FIG. 3, when in brake condition, the current Ivcm (indicated with a continuous line arrow) that flows in the branch formed by the low side pair of transistors MOS3 and MOS4, by VCM 2 and by resistor Rs, is pushed by the BEMF generated by motor 2 and therefore the equation in said branch is:

$$BEMF-(Rm+Rs+2*RdsON)*Ivcm-Lm*d(Ivcm)/dt=0 \qquad (1)$$

where Rm is the winding resistance of motor 2, Rs is the detection resistor, RdsON is the channel resistance of transistor MOS in saturation, Ivcm is the current circulating in motor 2 and Lm is the winding inductance of motor 2.

In the usual hard disk applications for the resistance Rm is much greater than the sum of Rs and RdsON and the mechanical inertia of motor 2 has a greater time constant than the electric constant and therefore during the brake step the equation (1) can be simplified as follows:

$$BEMF=Rm*Icvm \qquad (2).$$

Therefore in the brake condition, that is when there is a loss of supply, if motor 2 is rotating at a certain speed, and is thus generating a BEMF, and therefore motor 2 is capable of pushing an opposing current, the motion immediately activates a braking step for a determined period Tbrk. The higher the speed reached by the motor before the loss of supply voltage, the greater the braking action during the brake functioning.

Therefore both in the case of loss of supply and with the motor functioning normally the inventive system measures the BEMF generated by motor 2 by means of block 7.

In particular, during the brake condition, after the period Tbrk has passed, the system evaluates, by means of the comparator 9, whether the motor 2 is rotating beyond a given speed and in which direction by measuring the voltage in output from amplifier A1, that is, it measures the voltage present on line 10. This is possible because the current Ivcm is directly proportional to the BEMF, in accordance with the equation (2).

In accordance with this measurement the comparator 9 generates the signals 12 and 13, indicating respectively the rotation direction and if the speed of motor 2 is outside the interval Spd+ and Spd−, so that the timing block 8 generates the signal 15 so as to activate the diagonal of the output stage 1, for a predetermined period Tact, driving the current Ivcm in the correct direction to brake the motor 2, which current has the same direction but a greater value compared to the current present during the brake phase.

In doing so we find that the potential applied to the terminals of motor 2 is the sum of the voltage at the terminals of the output stage 1 and of the BEMF (BEMF generated by the motor in motion).

At the end of the period Tact, the output stage 1 is again placed in brake condition and the cycle is repeated until motor 2 returns to the range Spd+ Spd−.

In FIG. 4 the trend of the current profile to the terminals of the VCM is shown during the speed recovery following a loss of supply in accordance with the diagram of FIG. 3.

According to what is shown in FIG. 4, an X-axis indicating the time, expressed in milliseconds, and a Y-axis indicating the current, expressed in milliamperes, can be seen.

In said FIG. 4 the time trend of a signal 11 is represented, indicating that during the period T4, the motor 2 is supplied with the maximum voltage and therefore it is in an acceleration step, then during the period T5 shows the loss of the supply voltage.

The instant t5 indicates the moment at which there is the loss of supply voltage and the signal 11 goes to zero thus activating block 7, period T5.

In fact the output stage 1 is placed in brake condition, in which the BEMF of the motor 2 pushes a braking current in the motor 2 itself for a period Tbrk. At the end of Tbrk the strength and the direction of the current pushed by motor 2 are monitored by means of the double trip threshold comparator 9. According to the measurement made, the output stage 1 is driven saturating the two transistors MOS of the diagonal opposite that previously functioning for a period Tact.

In this period Tact the voltage applied to motor 2 is provided by the supply voltage of the output stage Vm plus the contribution of the BEMF so as to rapidly increase the current circulating in the motor 2 thus increasing the braking action applied to the motor 2 itself.

At the end of the period Tact the brake condition is again activated for a new cycle Tbrk and Tact until the motor 2 is slowed inside the threshold Spd+ Spd−.

Comparing FIG. 2 and FIG. 4 it can be deduced that the braking action made by means of block 7 is more effective as the overall braking time T5 is lower than time T3.

In the event the braking procedure is required to continue until motor 2 is stopped, the comparator 9 must be made with only one trip threshold Sref (not shown in the figure) representing the motor stop condition, also called zero motion. In such a case, at the end of the period Tact the brake condition is again activated for a new cycle Tbrk and Tact until the motor 2 is fully stopped.

Figure 5:
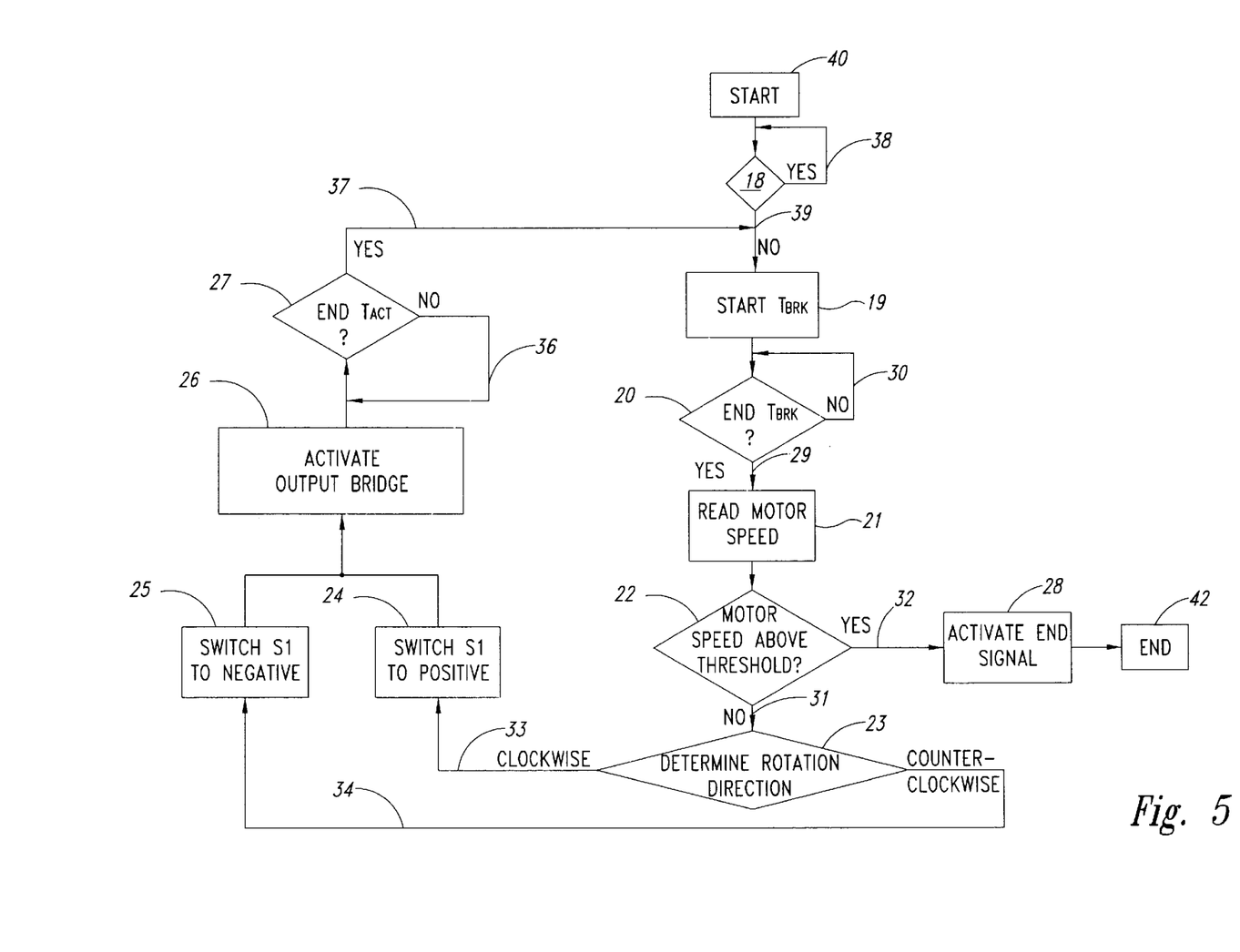
FIG. 5 shows a block diagram of the procedure for the speed recovery of a VCM according to the present invention.

FIG. 5 shows a block diagram of the procedure for the speed recovery of a VCM according to the present invention.

According to what is illustrated in FIG. 5, an initial block 40 can be noted followed by a first test block 18 on the signal 11 to check if said signal 11 is active or not. If negative, that is signal 11 active, indicating a normal power condition, branch 38, test 18 is again executed, while if positive, that is signal 11 equal to zero, indicating a power loss to the circuit, branch 39, the brake condition is activated for a period Tbrk, block 19.

Successively a second test block 20 is executed to check if said period Tbrk has passed. If negative, branch 30, the test 20 is executed again, while if affirmative, branch 29, the rotation speed of the VCM 2 is read, block 21, by means of the sense amplifier A1.

Then there is a third test block 22, to check if the speed of the VCM is between the assessment interval of the speed detector 9.

If positive, branch 32, block 28 is executed so as to generate the signal 16 of end of procedure and to end the program, block 42.

If negative, branch 31, a fourth test 23 is executed to check which is the rotation direction of motor 2.

If the direction is clockwise, branch 33, block 24 is executed, that is switch S1 is connected to the positive voltage Vin+ for a period Tact, while if the direction is anti-clockwise, branch 34, block 25 is executed, that is switch S1 is connected to the negative voltage Vin− for a period Tact.

Both blocks 24 and 25 activate a further block 26 so that the output stage 1 is driven saturating the two MOS of the diagonal of the output bridge 1 so as to force current in the same direction as the brake step.

Successively a fifth test 27 is executed to check if the period Tact has passed. If negative, branch 36, test 27 is again executed, while if positive, branch 37, the cycle starts again from the brake condition 19.

The periods Tbrk and Tact can be defined by the user so as to guarantee greater flexibility to the circuit and to the inventive method.

With the inventive system, therefore, more effective braking can be obtained and control on the speed of the motor during the braking phase can be obtained, as the speed recovery circuitry 7 makes it possible to drive the output stage 1 combining the more energetic action, for a period Tact, which consists in unbalancing the bridge 1 so as to force the maximum braking current, with the brake action, for a period Tbrk, which consists in activating both the low side transistors MOS of the bridge 1.

One possible alternative embodiment is to carry out the control of the current during the step in which a diagonal of the output stage 1 is activated.

In fact in the event the current is required to be controlled, the diagonal of the bridge 1 must be kept enabled until the current in motor 2 reaches a set value, after which it is completed and the step is carried out as previously illustrated.

From the foregoing it will be appreciated that, although specific embodiments of the invention have been described herein for purposes of illustration, various modification may be made without deviating from the spirit and scope of the invention. Accordingly, the invention is not limited except as by the appended claims.

What is claimed is:

1. Circuit for the speed recovery of a direct current motor comprising:
   an output stage including a first couple of transistors and of a second couple of transistors;
   first means, for detection of a first current in said motor during a first time period; and,
   second means, for activating said second couple of transistors of said output stage for a the first time period so as to short-circuit said motor, and at the end of said first time period, said second means being suitable for unbalancing said output stage so as to force second current, greater than said first current, for a determined second time period according to the value detected by said first means during said first time period.

2. Circuit for the speed recovery of a direct current motor according to claim 1, wherein said second means comprise a comparator, suitable for generating a direction signal and a speed signal, and a timer, suitable for driving said output stage for said first time period and controlling a switch for said second time period and generating an end-of-procedure signal.

3. Circuit for the speed recovery of a direct current motor according to claim 2, wherein said switch connects selectively said output stage to a positive voltage line or negative for said second time period.

4. Circuit for the speed recovery of a direct current motor according to claim 2, wherein said comparator receives in input a couple of reference signals and a signal generated by said detection means and generates in output a couple of signals suitable for indicating the exceeding of a determined rotation speed and rotation sense of said motor.

5. Circuit for the speed recovery of a direct current motor according to claim 4, wherein said thresholds represent the minimum speed at which said motor is stopped.

6. Circuit for the speed recovery of a direct current motor according to claim 4, wherein said thresholds can be defined by the user.

7. Circuit for the speed recovery of a direct current motor according to claim 4, wherein said comparator receives in input one single reference signal and said signal generated by said detection means and generates in output a couple of signals suitable for indicating the exceeding of a determined rotation speed and rotation direction of said motor.

8. Circuit for the speed recovery of a direct current motor according to claim 2, wherein said timer receives in input said two signals generated from said comparator and a signal of loss of supply voltage and said timer circuit executes said first time period and said second time period in function of said signals generated by said comparator.

9. Circuit for the speed recovery of a direct current motor according to claim 1, wherein said first detection means comprise a detection resistor and an operational amplifier.

10. Circuit for the speed recovery of a direct current motor according to claim 9, wherein said operational amplifier receives the input voltage at the terminals of said detection resistor and a voltage reference signal so as to generate said signal suitable for measuring the current that said motor generates.

11. Circuit for the speed recovery of a direct current motor according to claim 1, wherein said output stage is executed with N-channel MOSFET type power transistors placed in AB configuration.

12. Method for the speed recovery of a direct current motor, comprising:
   a) checking whether there is a loss of supply voltage;
   b) short-circuiting, for a first time period, a first couple of transistors;
   c) measuring a current proportional to the rotation speed of said motor;
   d) measuring said current proportional to the rotation direction of said motor;
   e) forcing a current of greater intensity than that measured during step c, and with the same polarity, for a second time period in said motor;
   f) repeating steps (b), (c), (d) and (e) until said current returns to a determined measure interval;
   g) generating an end-of-procedure signal.

13. A method, comprising:
   detecting a loss of power to a motor;
   short circuiting the motor;
   measuring strength and polarity of a first current in the motor; and
   if the strength of the first current measured during the measuring step exceeds a threshold then forcing a second current, greater than the first current and of the same polarity, in the motor.

14. The method of claim 13, further including:
   after the forcing step, repeating to the short circuiting step and the measuring step.

15. The method of claim 13, wherein the detecting step comprises:
   observing a level of power to a motor;

if the motor is receiving a normal level of power, repeating the observing step; and if motor is not receiving the normal level of power, proceeding to the short circuiting step.

16. The method of claim 15 wherein, if the strength of the current measured during the measuring step does not exceed the threshold, repeating the detecting step.

17. The method of claim 13 wherein the threshold is 0 mA.

18. A device, comprising:

a direct current motor;

a current detection circuit configured to detect the strength and polarity of a current in the motor; a power supply detection circuit configured to monitor a power supply to the motor;

a driver circuit configured to short circuit the motor in the presence of a first signal at a first input terminal, and further configured to supply the current to the motor, of either a first or a second polarity, according to the state of a second signal at a second input terminal; and a control circuit configured to receive inputs from the current detection circuit and the power supply detection circuit, and configured to provide the first signal at the first input terminal for a first time period if the power supply to the motor is below normal according to the power supply detection circuit, and further configured to provide the second signal at the second input terminal for a second time period to force a current in the motor of a greater strength and the same polarity, according to the current detection circuit.

19. The device of claim 18 wherein the driver circuit comprises:

a first switch having a first conduction terminal connected to a supply voltage and a second terminal connected to a first terminal of the motor;

a second switch having a first conduction terminal connected to a supply voltage and a second terminal connected to a second terminal of the motor;

a third switch having a first terminal connected to the first terminal of the motor and a second terminal connected to a circuit ground;

a fourth switch having a first terminal connected to the second terminal of the motor and a second terminal connected to a circuit ground;

and wherein the driver circuit is configured to conduct through the first and third switches to force a current in the motor of the first polarity, to conduct through the second and fourth switches to force a current in the motor of the second polarity, and to conduct through the third and fourth switches to short circuit the motor.

20. The device of claim 19 wherein the first, second, third and fourth switches are MOS transistors.

21. The device of claim 18 wherein the control circuit is configured to provide the first signal at the first input terminal for a third time period if, after the second time period the current strength exceeds a selected threshold according to the current detection circuit.

22. The device of claim 21 wherein the selected threshold is 0 mA.

23. Circuit for the speed recovery of a direct current motor comprising:

an output stage including a first couple of transistors and of a second couple of transistors;

first means, for detection of a circulating current in said motor; and, second means, for activating said second couple of transistors of said output stage for a determined first time period so as to short-circuit said motor, and at the end of said first time period, said second means being suitable for unbalancing said output stage so as to force the maximum circulating current for a determined second time period according to the value detected by said first means during said first time period, said second means comprising a comparator, suitable for generating a direction signal and a speed signal, and a timer, suitable for driving said output stage for said first time period and controlling a switch for said second time period and generating an end-of-procedure signal, and wherein said switch connects selectively said output stage to a positive voltage line or negative for said second time period.

24. Circuit for the speed recovery of a direct current motor comprising:

an output stage including a first couple of transistors and of a second couple of transistors;

first means, for detection of a circulating current in said motor; and, second means, for activating said second couple of transistors of said output stage for a determined first time period so as to short-circuit said motor, and at the end of said first time period, said second means being suitable for unbalancing said output stage so as to force the maximum circulating current for a determined second time period according to the value detected by said first means during said first time period, said second means comprising a comparator, suitable for generating a direction signal and a speed signal, and a timer, suitable for driving said output stage for said first time period and controlling a switch for said second time period and generating an end-of-procedure signal, and wherein said comparator receives in input a couple of reference signals and a signal generated by said detection means and generates in output a couple of signals suitable for indicating the exceeding of a determined rotation speed and rotation sense of said motor.

25. Circuit for the speed recovery of a direct current motor comprising:

an output stage including a first couple of transistors and of a second couple of transistors;

first means, for detection of a circulating current in said motor; and, second means, for activating said second couple of transistors of said output stage for a determined first time period so as to short-circuit said motor, and at the end of said first time period, said second means being suitable for unbalancing said output stage so as to force the maximum circulating current for a determined second time period according to the value detected by said first means during said first time period, said second means comprising a comparator, suitable for generating a direction signal and a speed signal, and a timer, suitable for driving said output stage for said first time period and controlling a switch for said second time period and generating an end-of-procedure signal, and wherein said timer receives in input said two signals generated from said comparator and a signal of loss of supply voltage and said timer circuit executes said first time period and said second time period in function of said signals generated by said comparator.

26. A device, comprising:

a direct current motor;

a current detection circuit configured to detect the strength and polarity of a current in the motor;

a power supply detection circuit configured to monitor a power supply to the motor;

a driver circuit configured to short circuit the motor in the presence of a first signal at a first input terminal, and further configured to supply the current to the motor, of either a first or a second polarity, according to the state of a second signal at a second input terminal; and a control circuit configured to receive inputs from the current detection circuit and the power supply detection circuit, and configured to provide the first signal at the first input terminal for a first time period if the power supply to the motor is below normal according to the power supply detection circuit, and further configured to provide the second signal at the second input terminal for a second time period to force a current in the motor of a greater strength and the same polarity, according to the current detection circuit, and wherein the control circuit is configured to provide the first signal at the first input terminal for a third time period if, after the second time period the current strength exceeds a selected threshold according to the current detection circuit.

* * * * *

UNITED STATES PATENT AND TRADEMARK OFFICE
CERTIFICATE OF CORRECTION

PATENT NO. : 6,680,598 B2
DATED : January 20, 2004
INVENTOR(S) : Ezio Galbiati et al.

It is certified that error appears in the above-identified patent and that said Letters Patent is hereby corrected as shown below:

Column 7,
Line 48, "for a the first time period" should read as -- for the first time period --.
Lines 51-52, "to force second current," should read as -- to force a second current, --.

Signed and Sealed this

Fifteenth Day of June, 2004

JON W. DUDAS
*Acting Director of the United States Patent and Trademark Office*